United States Patent [19]

Endoh et al.

[11] Patent Number: 5,329,267
[45] Date of Patent: Jul. 12, 1994

[54] MAGNET ASSEMBLY AND A VOICE COIL MOTOR USING SUCH MAGNET ASSEMBLY

[75] Inventors: Minoru Endoh, Kumagaya; Koichi Oda, Ageo, both of Japan

[73] Assignee: Hitachi Metals, Ltd., Tokyo, Japan

[21] Appl. No.: 29,609

[22] Filed: Mar. 11, 1993

[30] Foreign Application Priority Data

Mar. 13, 1992 [JP] Japan ................................. 4-089604

[51] Int. Cl.$^5$ ........................... H01F 7/02; H01F 7/08; G01B 7/00
[52] U.S. Cl. ................................... 335/222; 335/306; 335/229; 360/106; 310/154
[58] Field of Search ............... 335/222, 229, 302, 306; 360/78.12, 78.13, 104-109; 310/36-39, 154, 156

[56] References Cited

U.S. PATENT DOCUMENTS 4,945,330 7/1990 Arita ................................... 335/229

FOREIGN PATENT DOCUMENTS 61-273163 12/1986 Japan .
2-299453 12/1990 Japan .

Primary Examiner—Leo P. Picard
Assistant Examiner—Raymond Barrera
Attorney, Agent, or Firm—Finnegan, Henderson, Farabow, Garrett & Dunner

[57] ABSTRACT

Magnet assemblies for installation into a voice coil motor is described. A pair of magnetic pieces are molded into circular arc shapes of different radii and positioned concentrically across a gap. The ends of such the pair of magnet pieces, are joined to a similarly-molded other pair of magnet pieces. The direction of magnetization of the former pair of magnet pieces is reverse that of latter pair of a magnet pieces. On the upper curved surface of each of the two units of lower magnet pieces of smaller radius, a cut plane, for example, is formed in order to provide unbalanced cubic volume between one half and the other half from the center plane of a magnet piece, thus increasing the gap magnetic flux density being generated inside the gap at the sections of larger cubic volume, thereby improving overall evenness of the gap magnetic flux density distribution.

6 Claims, 13 Drawing Sheets

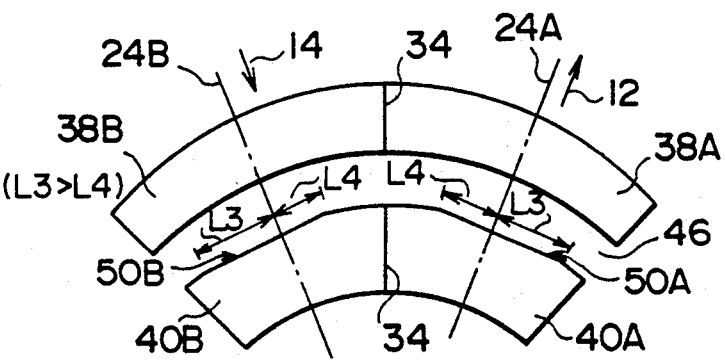
FIG.I(A) (L3>L4)
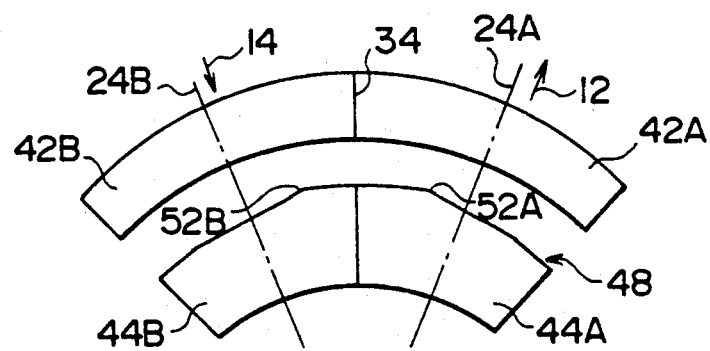
FIG.I(B)
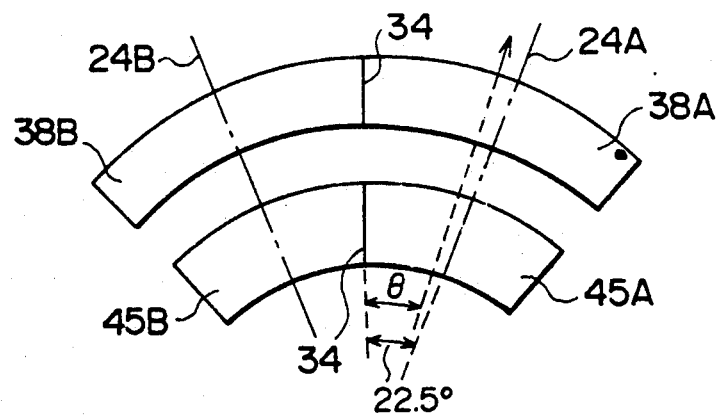
FIG.I(C)

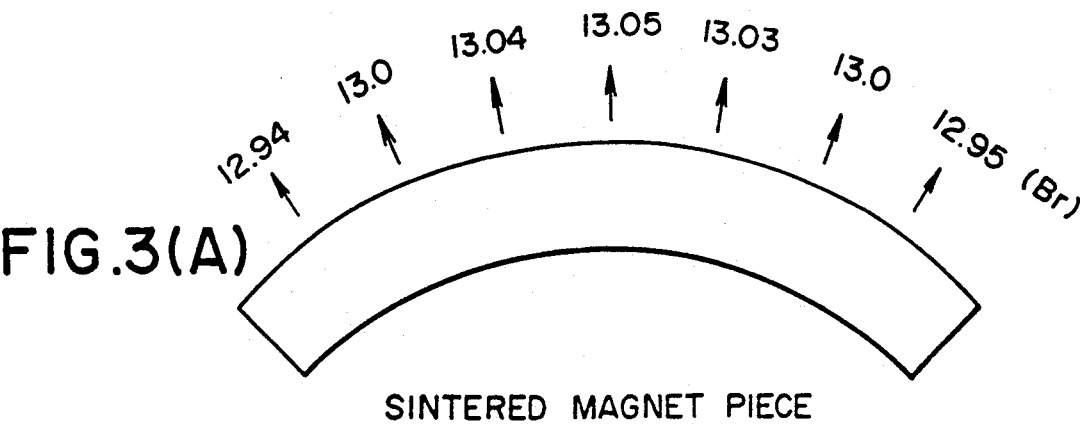
FIG.3(A) SINTERED MAGNET PIECE
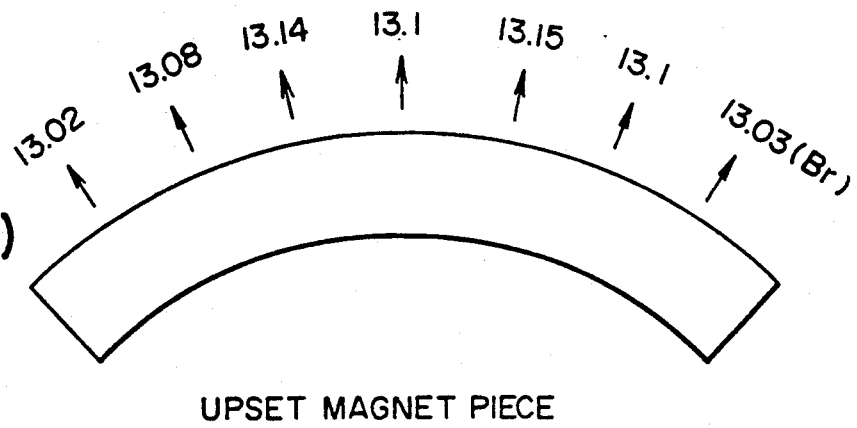
FIG.3(B) UPSET MAGNET PIECE

PRIOR ART

PRIOR ART

MAGNET ASSEMBLY AND A VOICE COIL MOTOR USING SUCH MAGNET ASSEMBLY

BACKGROUND OF THE INVENTION

1. Field of the Invention

This invention relates to a magnet assembly and a voice coil motor using such magnet assembly, more particularly, of a magnet assembly and a voice coil motor for use with such equipment as the magnetic head positioning actuator of a hard disc drive unit.

2. Related art

In general, in the field of voice coil motors for positioning of magnetic heads, featuring the combined use of a magnetic circuit and a moving coil, various types of voice coil motors have already been developed having various magnetic circuit structures, magnetic characteristics and moving coil shapes.

FIGS. 14 to 16 show an example of conventional voice coil motors wherein the exemplified voice coil motor is provided with a roof-shaped yoke 2 having a circular arc shape at its lower surface and in a roof shape at its upper surface, wherein beneath the yoke 2, a yoke 6 of circular arc shape is provided with both ends directed upwards for connection to the roof-shaped yoke 2, thereby forming a required gap 4 between the yokes 2 and 6.

Meanwhile, the terms up and down, above and below or over and beneath are merely to be used for explanatory purposes in relation to the drawings but not to indicate relative positions in the actual structure.

Beneath the roof-shaped yoke 2, or in the central part of the circular arc surface facing the gap 4, two units of upper magnetic pieces 8A and 8B having an arc shape are adhered, on the upper surface of circular arc-shaped yoke 6, or in the central part of the circular arc surface facing the gap 4, two units having a lower magnet 10A and 10B of circular arc shape of smaller radii than the radii of upper magnets 8A and 8B, are adhered in concentricity with the upper magnet pieces 8A and 8B.

The pairs of magnet pieces are magnetized in opposing directions. For example, as FIG. 16 shows, with the right-hand upper and lower magnet pieces 8A and 10A, the magnetizing direction 12 is directed toward the outside of the radial direction of the circular arc, while with the left-hand upper and lower magnet pieces 8B and 10B, the magnetizing direction 14 is directed toward the inside of the radial direction of the circular arc.

As FIGS. 14 and 15 show, in gap 4 formed by the upper and lower magnet pieces, a coil 18 fixed to the top end of an arm 16 which can swing around the center 0 of the circular arc as the supporting point is so installed to move in a circular arc locus through the gap 4.

To the other end of the arm 16, for example, a magnetic head 20 is installed so that when the arm 16 swings, the magnetic head 20 moves in the radial direction of turning magnetic disc 22.

A magnetic disc drive unit must have a higher thrust and, at the same time, flatter thrust-displacement characteristics, otherwise, if thrust is not constant against displacement, dispersion occurs with access time.

The magnet pieces 8A, 8B, 10A and 10B preferably include magnet materials with higher magnetic properties such as $Sm_2Co_{17}$ or Nd-Fe-B sintered magnet pieces. Such sintered magnet pieces are produced by filling, for example powdered alloy into a cavity 30 shaped in sector form, or a circular arc, provided on the surface of a mold block 28 as shown in FIG. 17, and by press-forming the alloy powder filled into the cavity 30 using a push rod, which is not indicated in FIG. 17, before sintering the thus press-formed alloy powder.

During the sintering process, the magnet materials are formed with their magnetic orientation in a specified direction by magnetizing, for example, to a magnetic field 32 directed in the horizontal direction to provide the required orientation in the magnetic field of the magnetic materials.

With a magnet piece thus produced, a phenomenon is known to occur where the magnetic flux density in the center portion is higher than that at both ends of the magnet piece. If these magnet pieces of dispersed magnetic flux density are used, the thrust becomes larger in sections with higher magnetic flux density and lower in sections with lower magnetic flux density and constant thrust cannot be maintained against displacement.

The degree of magnetic flux density is proportional to the magnet's cubic volume with a uniform material magnet. In order to obtain uniform magnetic flux density throughout all the magnet sections, a method has been adopted whereby the thickness at the central portion of a magnet where magnetic flux density becomes higher, is made thinner.

FIG. 16 shows an example of the method wherein the upper arc surfaces of the lower magnet pieces 10A and 10B are cut and removed to form flat surfaces of equal length (L1=L2) from the center planes 24A and 24B, which equally divide the lower magnet pieces 10A and 10B. 26A and 26B represent the cut planes.

Nevertheless, even if such magnet pieces are made thinner at the central portion and used as the magnetic circuit of a voice coil motor as shown in FIG. 14 and FIG. 15, it has not been possible to move the magnetic head 20 with a constant thrust throughout the swinging range of the coil 18 of the motor and of the arm 16.

SUMMARY OF THE INVENTION

The present invention provides a magnet assembly and a voice coil motor wherewith a constant thrust can be obtained.

The present invention also provides a magnet assembly for substantially improving the flatness of the gap magnetic flux density generated in the gap between the upper and lower magnet pieces.

The present invention furthermore provides a voice coil motor for a rotating or swinging motion, thereby smoothly eliminating rotational or swinging unevenness.

Initially, in order to determine the reason for a constant thrust unattainable with a motor equipped with the aforementioned magnet pieces wherewith the central portion is made thinner to provide level magnetic flux density, the inventor measured magnetic flux density in the gap 4 (hereafter called gap magnetic flux density) as in FIG. 14 and FIG. 15. The results of the measurement are given in FIG. 18. The gap magnetic flux density varies in a trapezoid-like form in a point symmetry with the junction point of the magnet pieces as the center of the point symmetry. However, the trapezoid-like form is not sufficiently flat and the absolute value of the gap magnetic flux density near the junction portion of the magnet pieces exhibits a substantial drop, such drop having presumably interfered with uniform thrust distribution of the motor.

Although the reason for a drop in gap magnetic flux density at the junction portion of the magnet pieces has not yet been theorized, as shown in FIG. 19, in the case where the direction of magnetization 12 of the right-hand upper and lower magnet pieces 8A and 10A and the direction of magnetization 14 of the left-hand upper and lower magnet pieces 8B and 10B are almost opposite, short-circuiting magnetic flux 36 occurs near the junction portion of the left-hand and right-hand magnet pieces which presumably interferes with the flow of magnetic flux between the upper and lower magnet pieces. In other words, the inventor discovered that, even if magnetic flux density of each of the magnet pieces was made as flat as possible, the gap magnetic flux density cannot be leveled for the aforementioned reason and that the resultant thrust of the motor cannot be made constant.

This invention is a result of the aforementioned findings.

The first invention relates to a magnet assembly consisting of magnet pieces with circular arc section and with magnetic flux density at one end of the periphery and the neighboring section higher than that at other sections. The magnet pieces are adhered in combinations such as of aforementioned magnet pieces 8A and 8B or 10A and 10B, characterized by a circular arc section and by the magnetic flux density at one end of the periphery and the neighboring section of the magnet piece being higher than the magnetic flux density at other sections and by adherence of two units of such magnet pieces having opposing orientation.

The second invention relates to a voice coil motor, using the magnet assemblies of the first invention, comprising an upper yoke and lower yoke positioned at a distance to produce the required clearance, a pair of circular arc shaped magnet assemblies adhered to the surfaces facing the clearance of the upper yoke and lower yoke respectively, and a coil swinging in an arc path inside the gap formed between the pair of magnet assemblies, At least one of the pair of magnet assemblies has a circular arc section and the magnetic flux density at one end of its periphery and at the neighboring section is larger than at the other section. The magnet assemblies consist of two units of magnet pieces having been magnetized in opposite directions joined together at the end.

The magnet assembly of this invention includes two units of magnet pieces having circular arc sections. The magnetic flux density at one end of their periphery and the neighboring section is higher than at other sections. The two units of magnet pieces are joined at the ends, thus resulting in a drop of magnetic flux density at the junction point and the neighboring section caused by the influence of the aforementioned short-circuiting magnetic flux to approximate the magnetic flux density at other sections. Thus, gap magnetic flux density when installed into a motor can be leveled and the thrust of the coil can be made uniform and even.

Measures to make magnetic flux density at one end of the periphery and at the neighboring section higher than at other sections include, 1. Increasing the cubic volume of the end and of its proximity, 2. Concentrating magnetic flux to the end, and 3. Adopting a combined magnet-piece structure using, to compose the end, a particular magnetic material to provide higher magnetic flux density than the material being used to compose other portions.

Such aspects as to what extent the cubic volume can be actually increased can be determined accordingly depending on the overall dimensions and shape of the subject magnet pieces. Meanwhile, magnet pieces with circular arc sections mean, not only those with a perfect circular arc but also those which resemble the circular arc sections.

BRIEF DESCRIPTION OF THE DRAWINGS

FIGS. 1(A) to 1(C) are top views showing the magnet assembly of the first invention.

FIGS. 3(A) and 3(B) are drawings indicating magnetic flux density in the radial direction of the arc shaped magnet pieces produced through the sintering method and through the upsetting process.

DETAILED DESCRIPTION OF THE PREFERRED EMBODIMENTS

Figure 2:
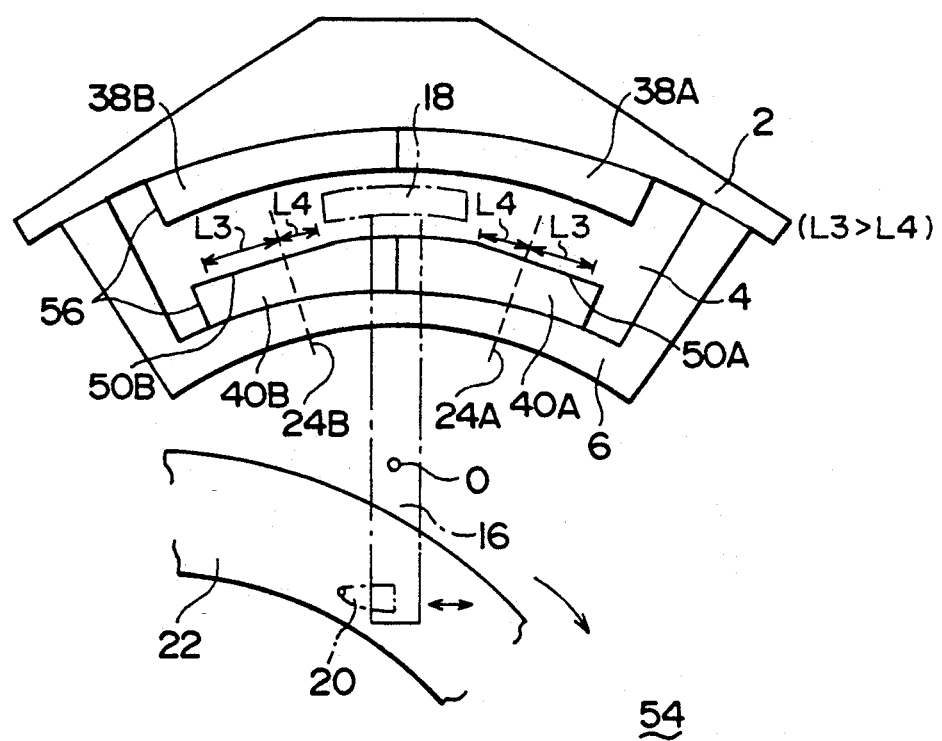
FIG. 2 is a top view indicating the voice coil motor of the second invention.

Referring more particularly to the embodiments of the present invention according to the attached drawings, as shown in FIG. 1 (A) and (B), the magnet assembly of the first invention is comprised of right-hand pairs of magnet pieces 38A and 40A and 42A and 44A molded in circular arc shapes with different radii. The upper and lower magnet pieces 38A and 40A as FIG. 1(A) and the upper and lower magnet pieces 42A and 44A as in FIG. 1 (B) are positioned concentrically across the gap 46 or 48, respectively, with the direction of magnetization 12 directed toward the outside of the radial direction of the arc.

Left-hand pairs of magnet pieces 38B and 40B and 42B and 44B are molded in circular arc shapes of the same curvature as of the corresponding magnet piece among aforementioned right-hand pairs of magnet pieces. Each magnet piece 38B, 40B, 42B or 44B is joined to an end of the corresponding right-hand magnet piece 38A, 40A, 42A or 44A thus positioned in adjoining status.

Consequently, the upper and lower magnet pieces 38B and 40B in FIG. 1 (A) or the upper and lower magnet pieces 42B and 44B are concentrically positioned across the gap 46 or 48, respectively.

The direction of magnetization 14 of these magnet pieces is in reverse to the direction of magnetization of right-hand magnet pieces namely, toward the inside of the radial direction of the circular arcs.

Among the aforementioned magnet pieces, those with smaller radii namely, the lower magnet pieces 40A and 40B or 44A and 44B are so structured that the cubic volume of the sections at the left and right of the center plane 24A or 24B becomes different in order to improve the evenness of gap magnetic flux density generated in the gap 46 or 48.

More particularly, with the magnet assembly as shown in FIG. 1 (A), the upper curved surface of the lower magnet piece 40A or 40B is formed in a cut-plane 50A or 50B which is asymmetrical about the center plane 24A or 24B in such way that the cubic volume of the other side of the joined ends side as against the center plane 24A or 24B may become smaller than the joined end side as against the center plane 24A or 24B.

The distances from the center plane 24A or 24B to the two ends of the cut planes L3 and L4 are so designed to become L3>L4 thus making the cubic volume of the other side of the joined end side smaller than that of the joined end side as against the center planes 24A or 24B, resulting in improved evenness of gap magnetic flux density. However, although the cut planes of the exemplified sketch are made in a straight shape, they may also be made in a circular shape of a different curvature or in a curved shape.

Whereas, with the magnet assembly shown in FIG. 1 (B), on the upper surface of each lower magnet piece 44A or 44B, a projection, 52A or 52B, toward the outside of the radial direction of the circular arc is formed on the joined end side as against the center plane 24A or 24B in order to make the cubic volume of the joined end side larger than that of the other side. This is done for the purpose of improving the evenness of gap magnetic flux density similar to the aforementioned case. Also, a combined structure employing the projection and the aforementioned asymmetrical cut-plane may also be suitable. Furthermore, although the projections and the aforementioned asymmetrical cut-planes were provided on the upper surface of the lower magnet pieces 40A, 40B, 44A or 44B, they may likewise be provided on the lower surface of the lower magnet pieces or either the upper or lower surfaces of the upper magnet pieces.

In the aforementioned structures, although the cubic volume of the left-hand and right-hand sections of the lower magnet piece 40A, 40B, 44A or 44B as against the center plane 24A or 24B was made uneven, it may be equally effective to make the cut plane 50A or 50B in compliance with the direction of orientation of the magnet as shown in FIG. 1 (C). Namely, the direction of orientation of a magnet produced for ordinary straight orientation comes to an angle of about 22.5° as against the junction plane 34. When the angle of this direction of orientation is changed, gap magnetic flux density being generated in the gap 46 can be improved to become more even by appropriate positioning of the cut plane 50A or 50B to the changed angle of the direction of orientation. For example, when setting in a direction of orientation relative to the junction plane 34 of the magnet pieces, at an angle $\theta$ smaller than the standard angle of 22.5°, namely, for example, about 20°, the cutting plane 50A or 50B to be provided on the upper arc surface of the lower magnet 45A or 45B should then be symmetric about the center plane 24A or 24B, thus resulting in improved evenness of gap magnetic flux density. Meanwhile, when so doing, depending on the angle of orientation, the cut plane 50A or 50B can also be made asymmetric about the center plane 24A or 24B. Also, if the direction of magnetization is brought nearer to the junction plane by making the angle of magnetization from the junction plane 34 even smaller, evenness of gap magnetic flux density can be improved leaving the cubic volume of the magnet piece intact.

Figure 17:
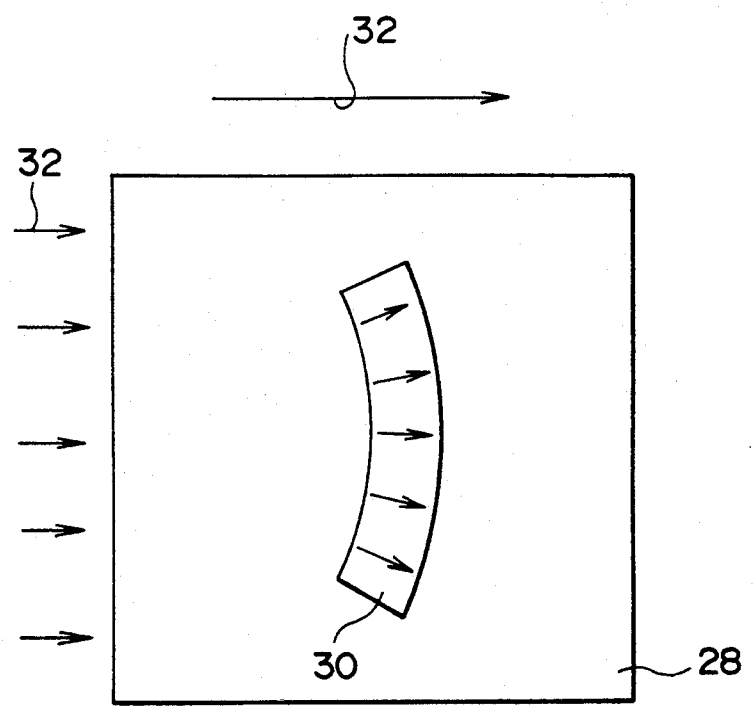
FIG. 17 is a top view of a mold to form a sintered magnet piece of circular arc form.
Figure 18:
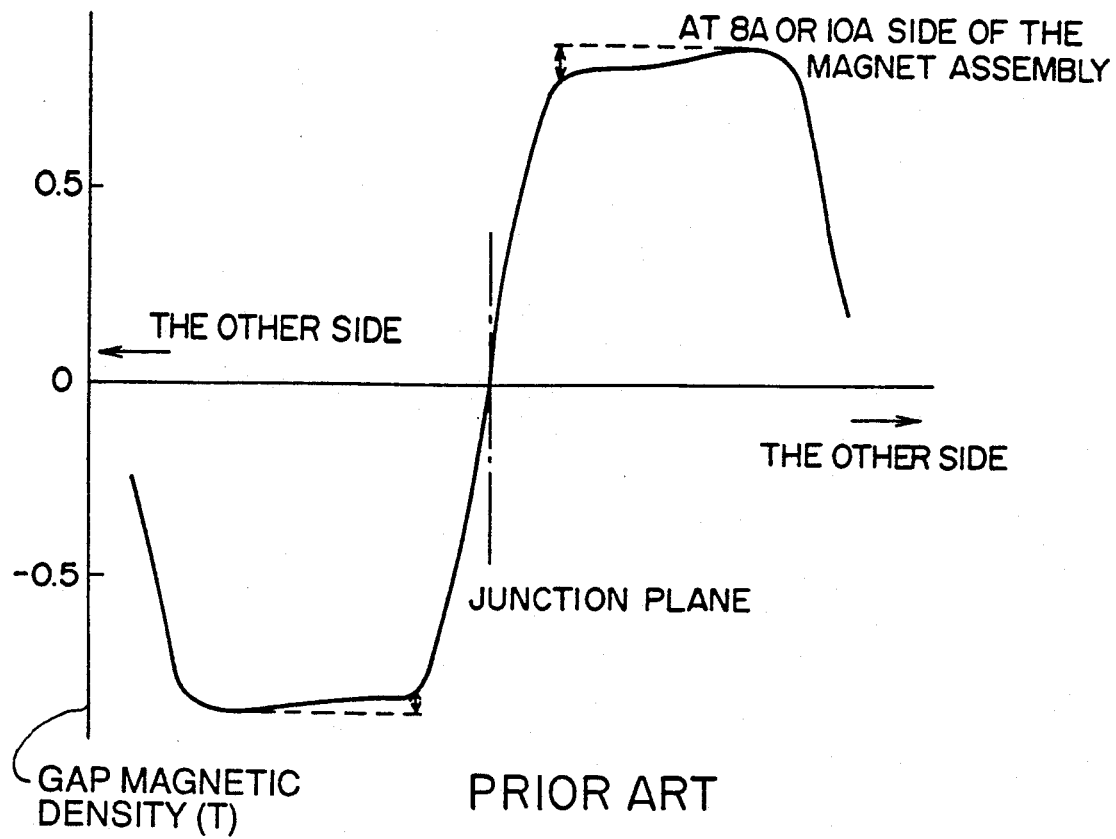
FIG. 18 is a graph indicating distribution of magnetic flux density in the gap between magnet assemblies with a conventional voice call motor.

Referring next to the molding of the aforementioned magnet pieces, powdered alloy is filled into the arc-shaped cavity 30 provided in the mold block 28 as shown in FIG. 17 and is sintering-molded while applying magnetic field 32 of specified direction or is upset-molded under a prescribed method without the application of magnetic field.

The magnet pieces thus molded in arc shape are then processed by, for example, cutting to provide the cutting plane. In this case, by making the position corresponding to the cut plane in the cavity 30 of the mold block 28 straight rather than a total circular arc in the horizontal section, the cutting process may be safely omitted.

Also, when molding magnet pieces as shown in FIG. (A) are provided with projections 52A and 52B, the cavity 30 in the mold block 28 can be made so that it corresponds to the aforementioned projection rather than a total circular arc in the horizontal section, thereby permitting magnet pieces of the prescribed projection to be molded using such a mold block.

The second invention is an application of the magnet assembly of the aforementioned first invention to the structure of a voice coil motor, an exemplary embodiment thereof being comprised of, as shown in FIG. 2, the voice coil motor 54 equipped with a roof-shaped yoke 2 formed in a circular arc configuration on the lower surface and of a roof-shape for the upper surface. The voice coil motor 54 is further equipped with a circular arc shaped yoke 6 formed in an arc-shape joined to the roof-shaped yoke 2 via arms at both ends bent upward, thus providing a required clearance, or gap 4, underneath the roof-shaped yoke 2.

Then, on the surfaces forming said gap 4, magnet assemblies 56 of the aforementioned first invention are installed. More particularly, two units of upper magnet pieces 38A and 38B as shown in FIG. 1 (A), molded in a circular arc shape and joined together at the center position of the yoke are fixed to the lower surface, or the arc surface facing the gap 4, of the roof-shaped yoke 2. Additionally, two units of lower magnet pieces 40A and 40B, as shown in FIG. 1 (A), joined together at the center position of the yoke are fixed to the upper surface, or the arc surface facing the gap 4, of said circular arc yoke 6.

On the upper surface of said lower magnet pieces 40A or 40B, as aforementioned, cut plane 50A or 50B is provided so that the cubic volume of the joined end side as against the center plane 24A or 24B may become larger than that of the other side of the center plane 24A or 24B.

In the midst of gap 4, a coil 18, fixed to the top end of an arm 16, which is installed so as to swing around the center of the circular arc 0 as the supporting point, is positioned to move in a circular arc locus inside the gap 4.

At the other end of the arm 16, for example, a magnetic head 20 is installed and is so structured that by swinging the arm 16 by flowing prescribed current through the coil 18, the magnetic head 20 is moved toward the radial direction of a turning magnetic disc 22.

In this exemplary embodiment, explanations were made using the magnet assembly as shown in FIG. 1 (A). However, the magnet assemblies shown in FIG. 1 (B) and FIG. 1 (C) may also be employed.

Also, the voice coil motor can be used as other types of drive units than the aforementioned application as the drive unit of the magnetic disc.

The exemplary embodiments of this invention and exemplary comparisons shall be explained precisely using particular figures.

EXEMPLARY COMPARISON 1

Magnet pieces of circular arc shape were produced through the sintering method and the ultra-quick-cooling upsetting process. The magnetic characteristic in the radial direction were measured.

The sintered magnet pieces were produced by first preparing molten alloy of $Nd_{13}$-$Dy_2$-Fe(bal)-$B_7$-$Al_1$ and letting it occlude hydrogen, executing dehydrogenation at 400°–600° C. and regulating particle size to 0.5 mm or less before pulverizing the material using a jet mill. Alloy powder thus obtained was then molded using a mold such as shown in FIG. 17 while applying straight magnetic field orientation before sintering and heat treating the molded alloy powder thus obtaining sintered magnet pieces.

The production of upset magnet pieces was made through the following procedures. Molten alloy of Nd-Fe-B-Ga was first quick-cooled, hot-pressed and then upset-processed to obtain magnet pieces of perfect circular arc shape the same as the sintered magnet pieces. The magnet pieces thus produced exhibited magnetic characteristics of (BH)max=40 MGOe.

Cutting two different types of circular arc shaped magnet pieces in the radial direction at several positions, residual magnetic flux density (Br) was measured. FIG. 3 shows the results of the measurement wherein FIG. 3 (A) indicates residual magnetic flux density of a sintered magnet piece and FIG. 3 (B) shows residual magnetic flux density of an upset magnet piece. FIG. 3 (A) indicates that residual magnetic flux density at the center section of the magnet piece is high and decreases toward the ends of the magnet piece. Although the magnet pieces were produced with the intention of obtaining straight orientation, the sintered magnet pieces actually obtained exhibited almost radial orientation.

As FIG. 3 (B) shows, with upset magnet pieces, although the difference in residual magnetic flux density between the center section and both ends was smaller than with the sintered magnet pieces, they also exhibited almost radial orientation.

Figure 4:
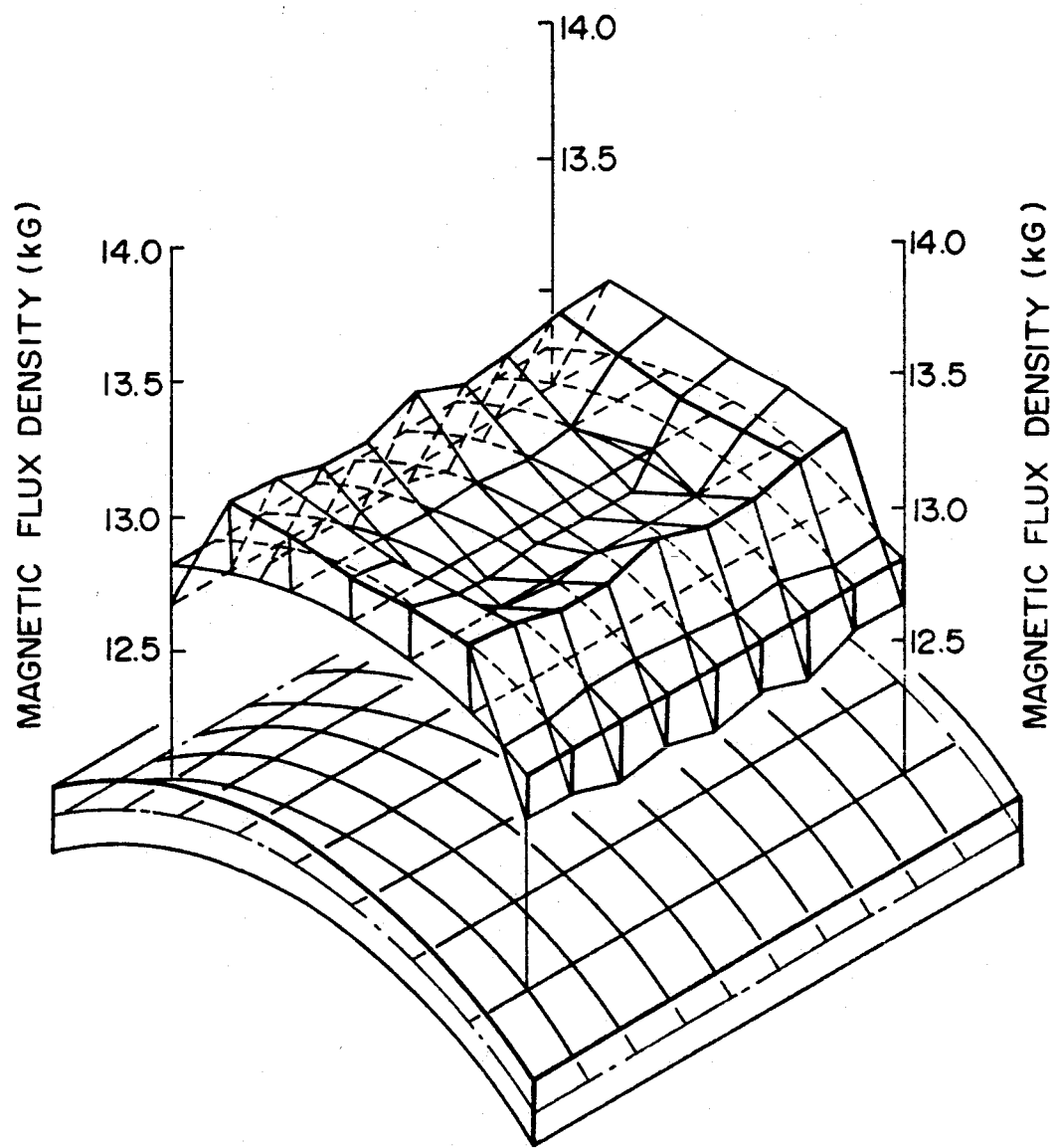
FIG. 4 is a drawing indicating magnetic flux density in three dimensions with a magnetic piece produced through the upsetting process, whose magnetic flux density in the radial direction is shown in FIG. 3.

Three-dimensional distribution of residual magnetic flux density of the upset magnet piece is given in FIG. 4.

EXEMPLARY COMPARISON 2

Figure 5:
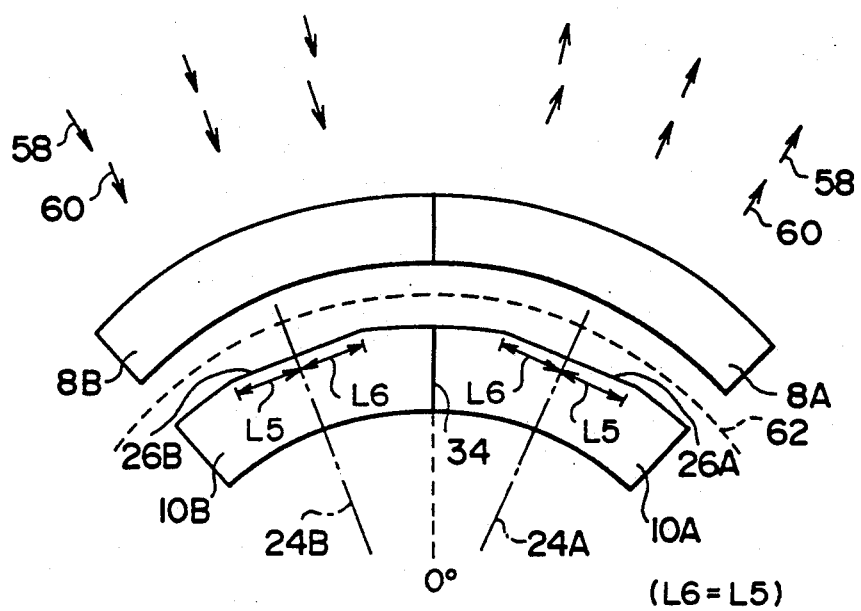
FIG. 5 is a drawing showing orientation of a conventional magnet piece used for the magnetic field analysis.
Figure 6:
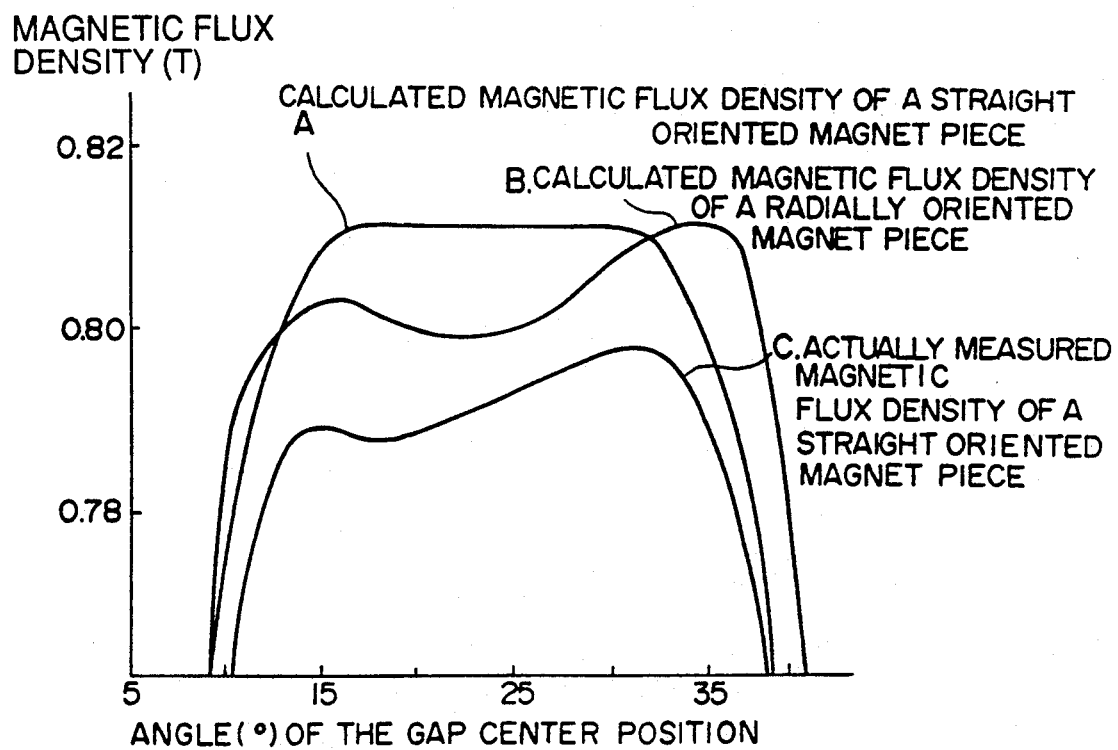
FIG. 6 consists of graphs indicating magnetic flux density of the center point of the gap obtained as a result of the magnetic field analysis.
Figure 14:
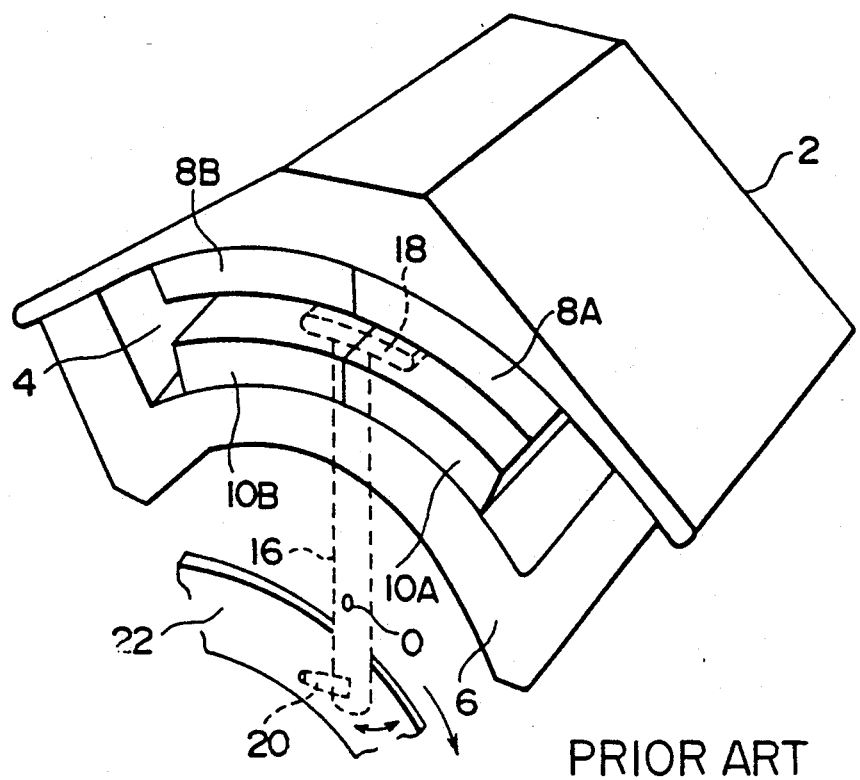
FIG. 14 is a perspective drawing showing a conventional voice coil motor.
Figure 15:
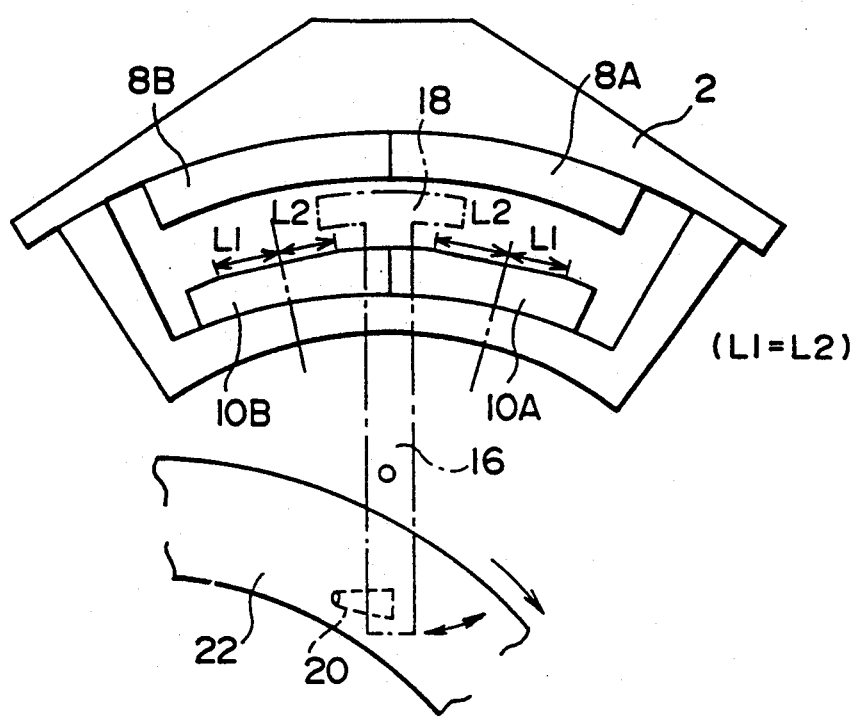
FIG. 15 is a top view of the voice coil motor as shown in FIG. 14.
Figure 16:
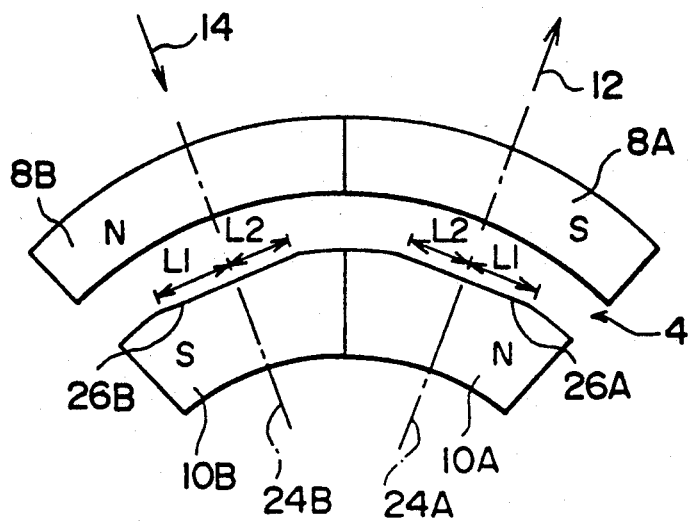
FIG. 16 is a top view of the magnet assembly being used for the motor as shown in FIG. 14.

Next, a magnet with magnetic characteristics of (BH)max=40 MGOe as obtained in the aforementioned exemplary comparison 1 was formed in conventional shapes (see FIG. 14) as shown in FIG. 5. Namely, cut planes 26A and 26B were provided on the upper arc surface of the lower magnet pieces 10A and 10B symmetrically about the center planes 24A and 24B (L5=L6). Applying either radial orientation 58 or straight orientation 60 to these magnet pieces, they were installed to voice coil motors as shown in FIG. 14. Then, magnetic pole analysis was performed on this motor using the finite element method. The magnetic flux density was measured along the center plane of the gap formed by curved surfaces of the magnet pieces. FIG. 6 shows the results thereof and indicates magnetic flux density variations with the right-hand magnet piece from the junction plane 34 only, however, magnetic flux density variations with the left-hand magnet piece are in point symmetry to the origin point. The axis of abscissa stands for the angle when the joined end 34 is regarded as 0°.

In said diagram, curve A stands for calculated magnetic flux density of a magnet piece which is straight-oriented calculatively, curve B represents calculated magnetic flux density of a magnet piece which is radially-oriented calculatively and curve C shows actually-measured magnetic flux density of a magnet piece produced and magnetized with the purpose of realizing straight orientation.

Figure 19:
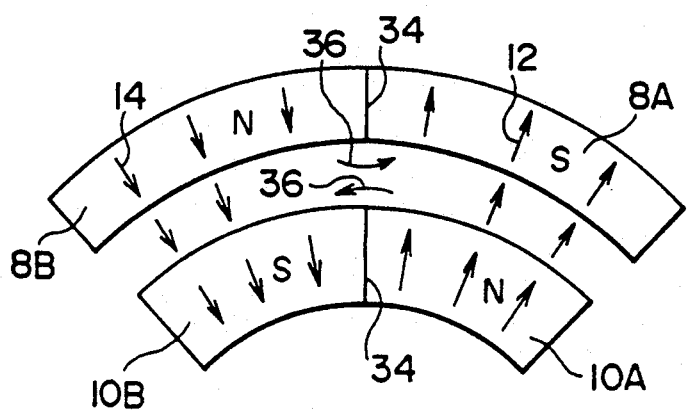
FIG. 19 is an explanatory sketch drawing of the flows of magnetic flux with circular arc shaped magnet pieces with radial orientation.

As indicated in FIG. 6, with the calculative straight-oriented magnet piece (curve A), gap magnetic flux density is at a higher level and flatness is also satisfactory. With the calculative radially-oriented magnet piece (curve B), gap magnetic flux density drops as the angle becomes smaller and flatness is less-than-satisfactory. However, the latter has a wider area of flatness in the magnetic flux density graph. The reason for the drop in the magnetic flux density curve as the angle becomes smaller is that, as shown in FIG. 19, magnetic flux tends to short-circuit in the vicinity of the junction plane since the directions of magnetization of the two neighboring magnet pieces are in reverse.

As shown by curve C, actual measurement values of gap magnetic flux density of a magnet piece produced and magnetized with the intention of realizing straight orientation, are disappointing both in level and in flatness. This is presumably because, with an actually-made magnet unit, even if it was produced intending to actualize straight orientation, components of radial orientation should still be included, substantially.

EXEMPLARY EMBODIMENT 1

Figure 7A:
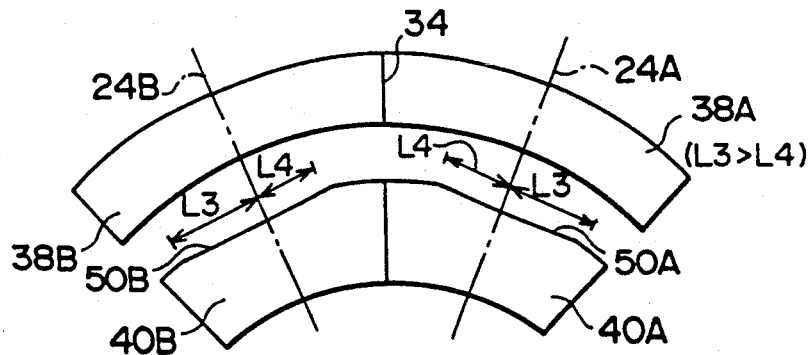
FIGS. 7(A) and 7(B) consist of drawings showing the shapes of the magnetic assemblies of this invention used for magnetic field analysis.
Figure 7B:
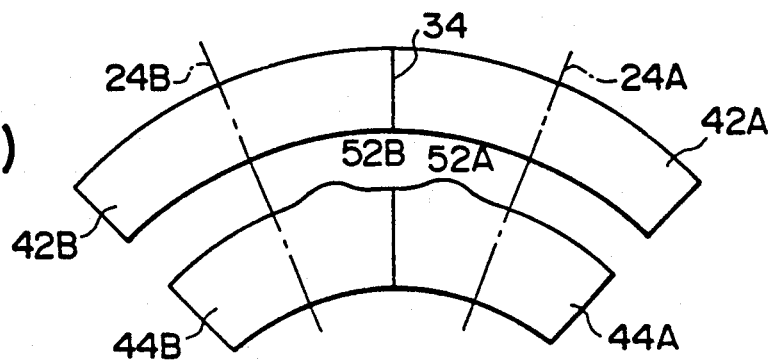
Figure 8A:
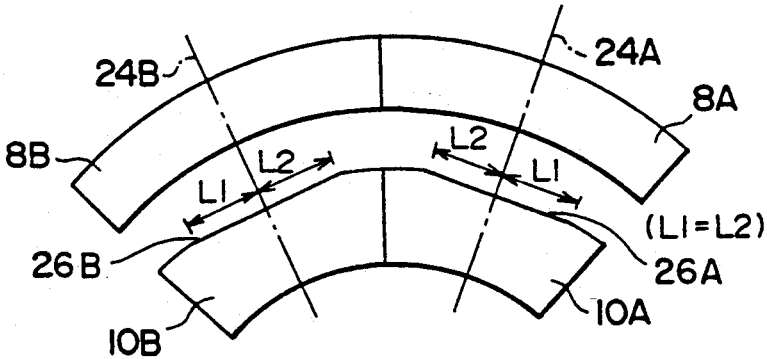
FIGS. 8(A) and 8(B) consist of drawings showing the shape of conventional magnet assemblies used for magnetic field analysis.
Figure 8B:
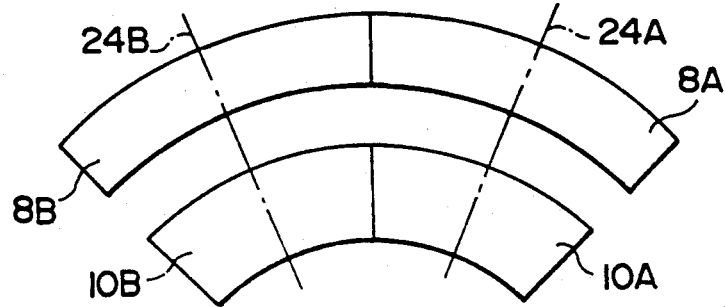

The inventor therefore designed magnet assemblies of shapes as are shown in FIGS. 7 & 8 through calculations, installed them to voice coil motors and performed magnetic field analysis under the finite element method. Magnet pieces were of radial orientation corresponding to (BH) max=40 MGOe.

FIG. 7 shows magnet assemblies of the present invention. FIG. 7 (B) shows magnet assemblies wherein the lower magnet piece 44A or 44B is provided with a projection 52A or 52B on the upper curved surface of the joined end side from the center plane 24A or 24B, similar to that shown in FIG. 1 (B). This makes the cubic volume of the joined end side portion of the magnet piece from the center plane 24A or 24B larger than that of the other side of the magnet piece.

FIG. 7 (A) shows magnet assemblies wherein a cut plane 50A or 50B, so positioned that it becomes asymmetric about the center plane 24A or 24B, is provided on the upper curved surface of the lower magnet piece 40A or 40B, similar to that shown in FIG. 1 (A). Namely, the distances from the center plane 24A or 24B to the two ends of the cut plane L3 and L4 are so designed to be in the relation L3>L4, thus making the cubic volume of the joined end side from the center plane 24A or 24B larger than the other side.

Figure 9:
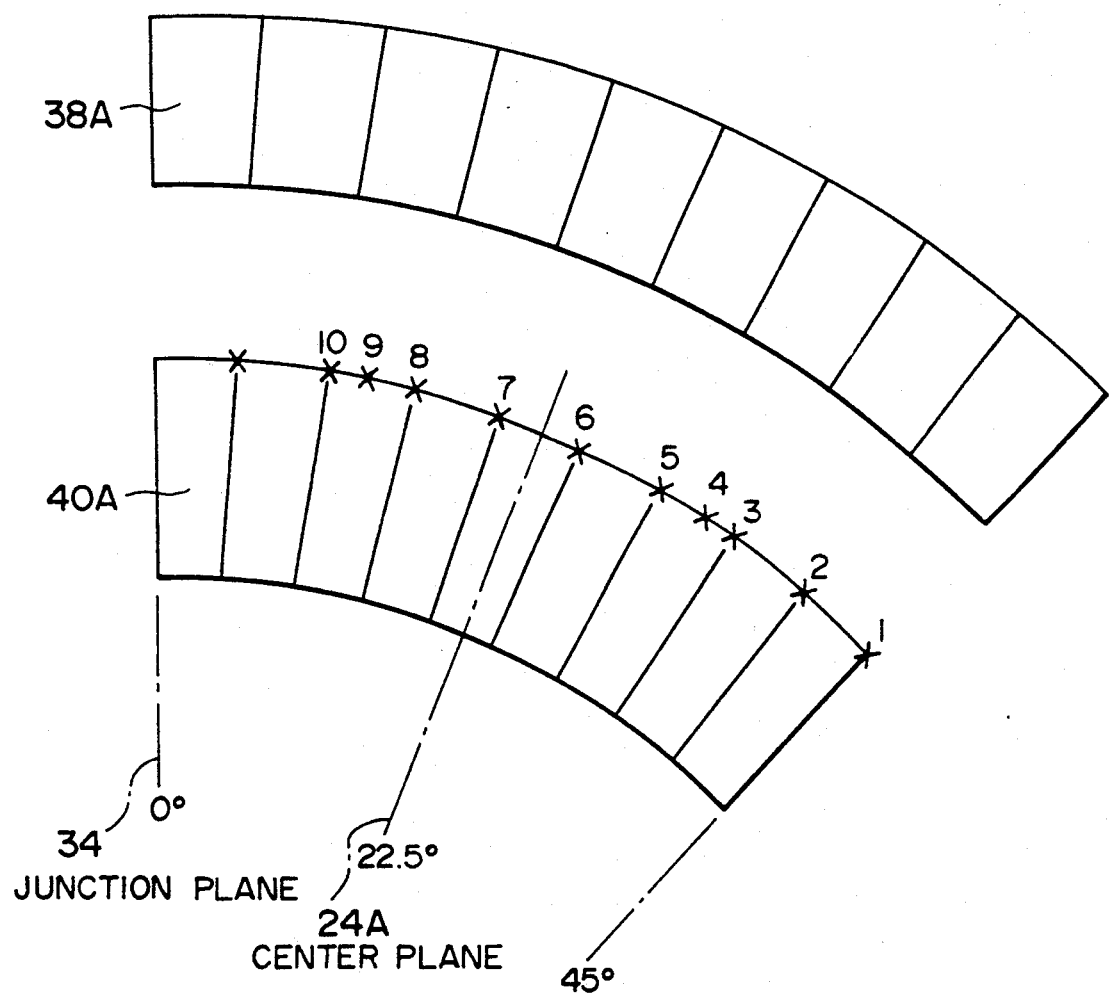
FIG. 9 is an explanatory sketch drawing showing locations of cut planes of magnet pieces.

In this exemplary embodiment, the position of the cut plane was changed to the variations as shown in FIG. 9 and magnetic field analysis was performed for each of these variations. FIG. 9 corresponds to the right-hand magnet pieces 38A and 40A shown in FIG. 7 (A). The magnet pieces have a circular arc angle of, for example, 45°, when the joined end 34 is regarded as 0° and their center plane 24A is located at 22.5°. The magnet piece in this diagram is typically divided into nine equal sections along the circular arc and explanatory numbers are given to optional points. Magnet pieces are cut through the lines connecting optionally-selected number pairs, thus constituting corresponding cut planes.

In this exemplary embodiment, cut planes connecting points 5-8, 4-8, 3-8, 4-9 and 2-7 were prepared for magnetic field analysis. In the case of cutting through the points 4-9, the cut plane becomes symmetric about the center plane 24A and the dimensions of the cut plane become equal to those of a conventional magnet assembly as shown in FIG. 14. Also, when cutting is made through points 5-8, the cut plane becomes symmetric about the center plane 24A, whereas when cutting is made through other combinations of points namely, points 4-8, 3-8 and 2-7, the cut planes become asymmetric about the center plane 24A and the cubic volume of the right-hand half from the center plane 24A of the magnet piece becomes smaller than the remaining half.

FIG. 8 shows magnet assemblies made for comparison and that in FIG. 8 (A) is provided with cut planes 26A and 26B which are symmetric about the center planes 24A and 24B, respectively, on the upper curved surfaces of the lower magnet pieces 10A and 10B similar to the magnet pieces shown in FIG. 14. The magnet assemblies correspond to those with the cut plane through points 4-9 as given in FIG. 9.

FIG. 8 (B) shows magnet pieces without any cut, so called no-cut magnet pieces.

Figure 10:
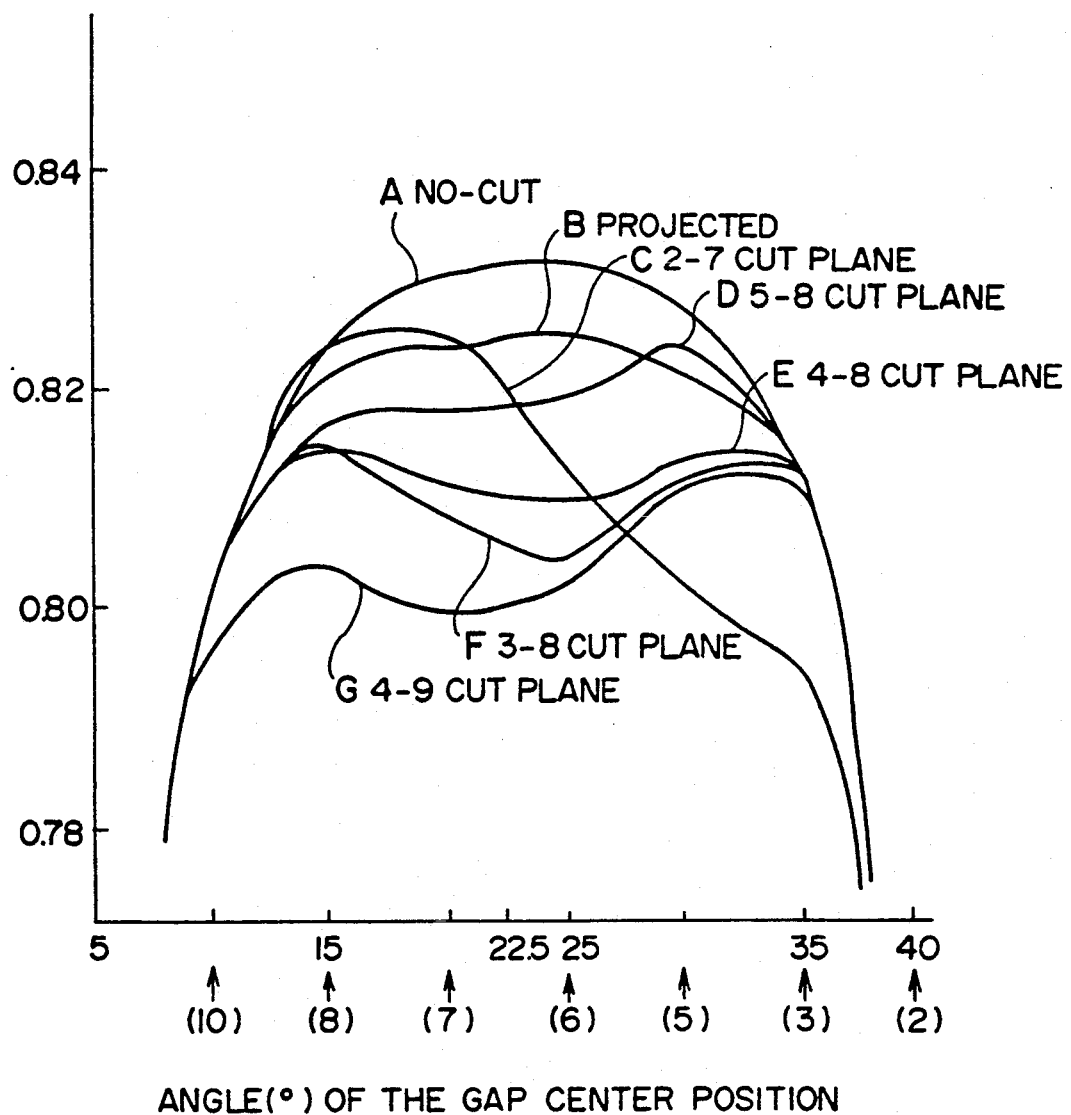
FIG. 10 consists of graphs indicating magnetic flux density of the center point of the gap obtained by the magnetic field analysis.

Graphs in FIG. 10 show variations of magnetic flux density along the center plane of the gap of all magnet pieces thus prepared as the result of magnetic field analysis. The axis of abscissa stands for the angle when the joined end 34 as in FIG. 9 is regarded as 0° and also for the positions of the numbered points used to identify the cut planes. In the graph of FIG. 10, curve A shows the performance of the no-cut magnet piece shown in FIG. 8 (B). Curve B indicates the performance of the magnet piece provided with a projection as shown in FIG. 7 (B), Curve C represents the performance of the magnet piece with the cut plane through points 2-7 as given in FIG. 9. Curve D corresponds to that of the magnet piece with the cut plane through points 5-8. Curve E corresponds to that of the magnet piece with the cut plane through points 4-8. Curve F indicates that of the magnet piece with the cut plane through points 3-8. Finally curve G shows that of the magnet piece with the cut plane through points 4-9, the same as for the magnet pieces shown in FIG. 8 (A).

As is evident in FIG. 10, curve A representing the no-cut magnet piece shows a higher level of magnetic flux density but flatness is very disappointing since a sharp dome shape is produced, thus indicating unsatisfactory magnetic characteristics.

Curve G which represents a conventional magnet piece shows a very low level of magnetic flux density and inferior flatness, thus suggesting deteriorated magnetic characteristics.

However, curves B, D, E and F show comparatively higher levels of magnetic flux density and satisfactory flatness. Curve E, especially, representing the performance of the magnet piece with the cut plane through points 4-8 indicates a higher level of magnetic flux density and the best flatness of all examples, thus indicating the best magnetic characteristics. Meanwhile, points 4-8 correspond to about 15°-30° in the angle.

Curve C representing the performance of the magnet piece with the cut plane through points 2-7 shows substantially deteriorated magnetic characteristics because a cut plane excessively unbalanced against the center plane 24A was provided.

Figure 11:
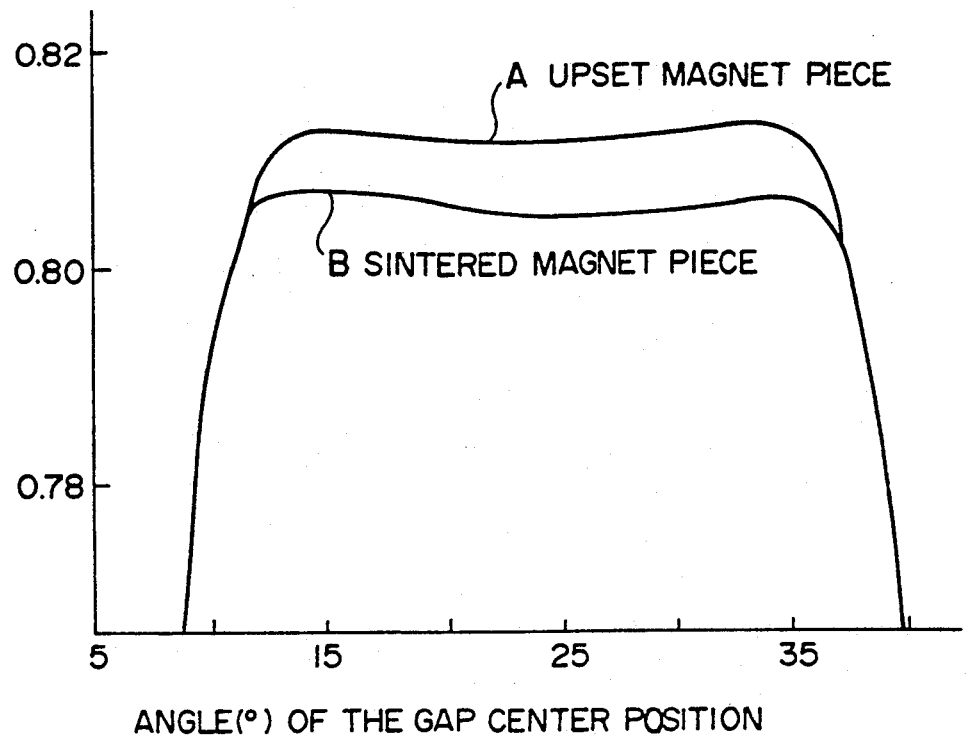
FIG. 11 consists of graphs indicating magnetic flux density of the center point of the gap with voice coil motors equipped with the magnet assemblies of this invention.

Sintered and upset magnet pieces obtained through the method as given in the exemplary comparison 1 through points 4-8, as in FIG. 9, where cut and installed onto voice coil motors, as shown in FIG. 2, as their magnet assemblies 56. Gap magnetic flux density was then measured to obtain the results given in FIG. 11.

In the diagram, curve A represents the performance of the upset magnet assemblies and curve B of the sintered magnet. Both curves A and B show a considerably high level of magnetic flux density and greatly improved flatness. Curve B, especially, representing the performance of upset magnet assemblies showed the best performance.

Although magnetic flux density was controlled by changing the cubic volume of each magnetic piece constituting the magnet assembly in the aforementioned exemplary embodiment, it can also be controlled by other methods given below.

Figure 12:
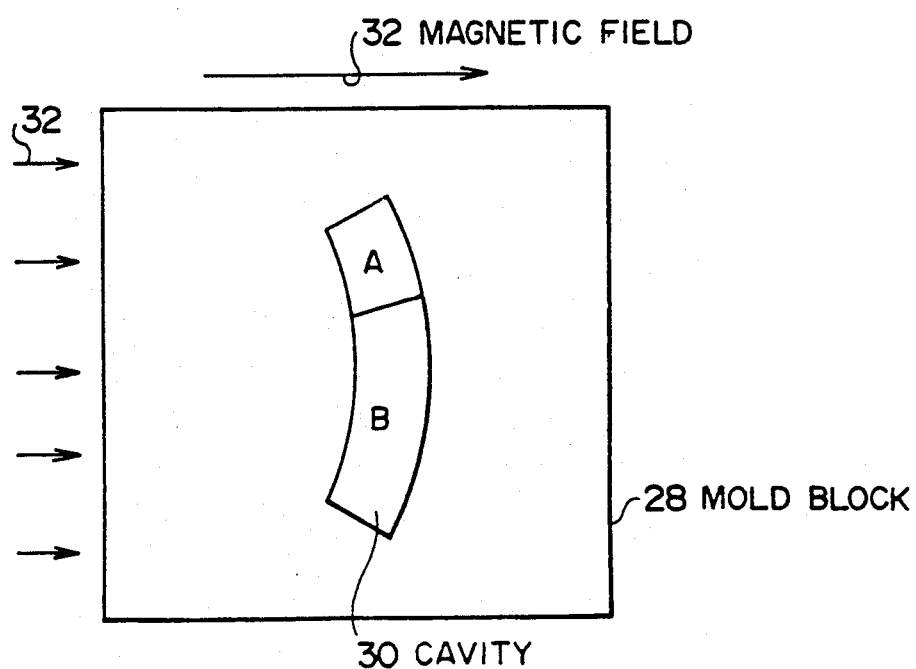
FIG. 12 is an explanatory sketch drawing showing a method to produce the magnet pieces of this invention.

As shown in FIG. 12, by filling alloy powder with characteristics exhibiting higher magnetic flux density than the other alloy powder into section A in the cavity 30 in the mold block 28 and filling the other powder into section B in the cavity, the materials can be press-formed and sintered to obtain sintered magnet pieces with higher magnetic flux density at section A than at section B.

Figure 13:
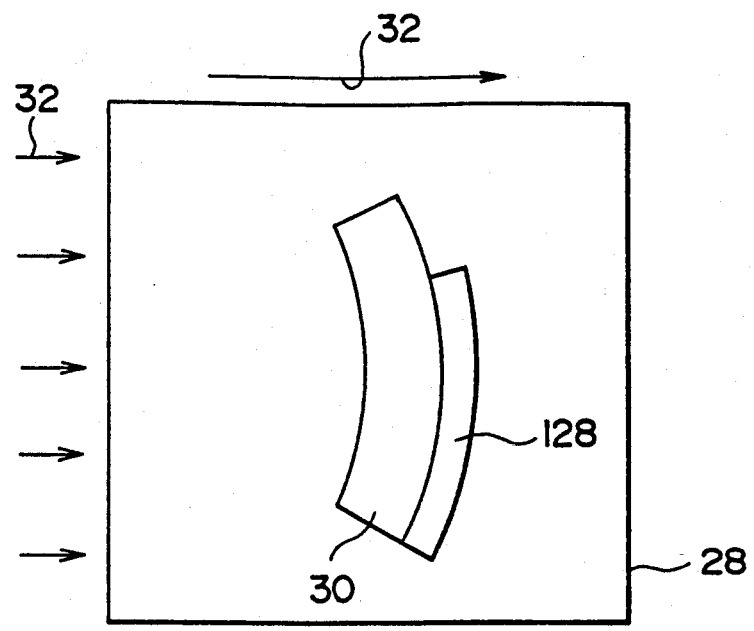
FIG. 13 is an explanatory sketch drawing showing another method to produce magnet pieces of this invention.

Also, as shown in FIG. 13, adding a section 128 for non-magnetic material such as Ti alloy to a portion of the cavity in a mold-block 28, such composite materials can be molded and magnetized to obtain magnet pieces wherein magnetic flux concentrates at the portion not in contact with the section of the non-magnetic material, thus increasing the magnetic flux density of the portion.

As aforementioned, this invention can greatly improve the evenness of gap magnetic flux density generated in the gap formed by magnet assemblies thus enabling a motor to perform rotation or swing smoothly, free from irregularities in rotation or in swing.

In addition to the aforementioned exemplary embodiment, this invention can also be adopted for different applications within the range of descriptions in the claims.

What is claimed is:

1. A magnet assembly for controlling magnetic flux density comprising:

two units of circular arc cross-sectioned magnet pieces, each unit having a first portion including a first end, a center portion, a second portion including a second end, an inner surface, and an outer surface, the two units abutted to each other at the first end of each unit, one unit having a direction of magnetization from the inner surface toward the outer surface of the unit, the other unit having a direction of magnetization from the outer surface toward the inner surface of the unit, each unit having a magnetic flux density higher in the first portion than that of the center and second portion.

2. The magnet assembly of claim 1, wherein a thickness from the inner surface to the outer surface of the units at the first portion is greater than a thickness at the second portion and the center portion.

3. The magnet assembly of claim 1, wherein each unit has a center plane bisecting the unit into a left portion including the first end and a right portion including the second end, the cubic volume of the right portion being smaller than the left portion, whereby asymmetrical cross-sections are provided about the center plane.

4. A voice coil motor for controlling the evenness of gap magnetic flux comprising:

an upper yoke and lower yoke oriented to provide a required clearance;

a pair of magnet assemblies fixed to the surfaces of the upper yoke and lower yoke facing the clearance, at least one of the pair of magnet assemblies having a circular arc cross-section of two magnet pieces, each magnet piece having a first portion including a first end, a center portion, an opposite second portion including a second end, an inner surface, and an outer surface, the two units abutted to each other at the first end of each unit, one unit having a direction of magnetization from the inner surface toward the outer surface of the unit, the other unit having a direction of magnetization from the outer surface toward the inner surface of the unit, each unit having a magnetic flux density being higher in the first portion than that of the center and the second portion; and a coil structured to swing through the gap formed between the pair of magnet assemblies.

5. The voice coil motor of claim 4, wherein a thickness from the inner surface to the outer surface of the units at the first portion is greater than a thickness at the second portion and the center portion.

6. The voice coil motor of claim 4, wherein each unit has a center plane bisecting the unit into a left portion including the first end and a right portion including the second end, the cubic volume of the right portion being smaller than the left portion, whereby asymmetrical cross sections are provided about the center plane.

* * * * *